:::

United States Patent Office 3,474,064
Patented Oct. 21, 1969

3,474,064
ROOM-TEMPERATURE VULCANIZABLE
SILICONE RUBBER STOCKS
Paul Hittmair, Siegfried Nitzsche, Manfred Wick, and
Ernst Wohlfarth, Burghausen, Germany, assignors to
Wacker-Chemie G.m.b.H., Munich, Germany
No Drawing. Filed Feb. 20, 1967, Ser. No. 617,063
Claims priority, application Germany, Feb. 23, 1966,
W 40,995
Int. Cl. C08g 31/10, 47/06
U.S. Cl. 260—37                                5 Claims

ABSTRACT OF THE DISCLOSURE

A silicone rubber stock curable at room-temperature is based on a diorganosiloxane polymer prepared by reacting a hydroxyl endblocked diorganosiloxane polymer with a diacyloxydiorganosilane admixed with a triacyloxy silicon compound and is useful over the broad range of sealants and coatings, wherein RTV silicone rubbers are presently employed.

Background of the invention

This invention is in the field of room-temperature vulcanizing (RTV) silicone elastomer materials and introduces a novel polymer-crosslinking system.

The recent developments in room-temperature vulcanizing silicone rubber stocks have been directed to both the polymer employed and the curing catalysts and crosslinking agents. In general, it is known that certain siloxane polymers having reactive groups bonded to silicon are chemically active toward crosslinking agents in the presence of certain catalysts. These materials cure spontaneously upon mixing and cannot be stored and marketed in a single package hence they are called two-component RTV silicone rubber stocks. In contrast, it is also known that certain siloxanes, particularly hydroxyl endblocked dimethylsiloxanes, can be admixed with certain trifunctional silanes such as alkyltriacyloxysilanes and the mixture is stable until it is exposed to water such as atmospheric water vapor whereupon the material will cure. These materials can be packaged in a single package and do not require further processing by the ultimate consumer and are known as one-component RTV silicone rubber stocks. The present invention is directed to a one-component RTV silicone rubber stock.

The known one-component RTV silicone rubber stocks include mixtures of diorganopolysiloxanes having reactive endgroups or endblockers and acyloxy substituted organic silicon compounds having at least three acyloxy groups per molecule. These mixtures are known as "acyloxy one-component systems." The acyloxy one-component systems have heretofore suffered the disadvantage of short storage life unless measures are taken to exclude water from the ingredients and storage package. The expense incurred in drying fillers and other ingredients has proved bothersome in the commercial exploitation of the acyloxy one-component systems. An alternative to the use of predried ingredients is the incorporation of anhydrides of aliphatically saturated carboxylic acids to the acyloxy one-component RTV stock. However, this often produces corrosion of metal substrates which come in contact with the RTV stock. Other disadvantages of the acyloxy one-component systems have included indifferent adhesion to substrates, relatively poor tear strength and the impossibility of preparing such a system which would cure to form a transparent elastomer.

The object of this invention is to introduce a new room-temperature vulcanizing silicone rubber composition. A further object is to introduce an acyloxy one-component RTV stock which is less sensitive to the presence of moisture during storage. A further object is an acyloxy one-component RTV silicone rubber system exhibiting good adhesion to substrates, good tear resistance and suitable for use in preparing transparent elastomeric products. Other objects and advantages of this invention are detailed in or will be apparent from the disclosure and claims following.

Summary of invention

This invention relates to a one-component room temperature vulcanizable silicone rubber stock which can be stored in the substantial absence of moisture and cures in the presence of water vapor characterized in that the stock is a mixture of (A) a diorganopolysiloxane prepared by reacting (1) a hydroxyl-endblocked diorganopolysiloxane with (2) an acyloxy substituted organosilicon compound of the general formula $R_2Si(OOCR')_2$, wherein each R is a monovalent hydrocarbon radical, halogenohydrocarbon radical or cyanoalkyl radical and each R' is a hydrogen atom or a monovalent hydrocarbon radical free of aliphatic unsaturation (B) acyloxy substituted organosilicon compound having at least three acyloxy groups per molecule.

Detailed description of invention

The organopolysiloxanes employed herein are well-known articles of commerce fully described in the prior art in such patents as U.S. Patents Nos. 2,843,555; 3,105,061 and 3,127,363 and 3,294,732. These organopolysiloxanes are essentially linear polymers having hydroxyl endblockers and can be represented by the general formula

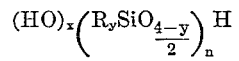

wherein $x$ has an average value of 0.99 to 1.01, $y$ has an average value of 1.99 to 2.01 and $x+y$ is 3.0, each R is a monovalent hydrocarbon, halogenohydrocarbon or cyanoalkyl radical and $n$ has a value of at least 3 and preferably at least 50 and does not exceed about 2,000.

The operable siloxane polymers are essentially linear hence are predominantly (i.e. at least 90 mol percent) $R_2SiO$ units. However, limited proportions, preferably below 5 mol percent and most preferably below 2 mol percent of $RSiO_{3/2}$ units, $R_3SiO_{1/2}$ units and/or $SiO_{4/2}$ units can be present. The closer the polymer approaches the R/Si ratio of 2.0/1 the better the ultimate product with the exception that a softer cured rubber essentially free of extractable, uncured polymeric material can be obtained by admixing diorganofunctional siloxane polymers having a functional group on each of the terminal silicon atoms with monofunctional siloxane polymers having a functional group on one of the terminal silicon atoms and the other terminal group being an $R_3SiO_{1/2}$ unit.

In the formulae above, each R can be a monovalent hydrocarbon radical of up to 36 acrbon atoms. Best results are achieved with hydrocarbon substituents of 1 to 18 carbon atoms. Examples of the radicals represented by R include alkyl radicals such as methyl, ethyl, n-propyl, isopropyl, dodecyl, octadecyl and myricyl, ($-C_aH_{2a+1}$ where $a$ is 1 to 36); alkenyl radicals such as vinyl, allyl, hexenyl and octadecenyl; cycloalkyl radicals such as cyclobutyl, cyclopentyl, cyclohexyl and cyclooctadecyl; cycloalkenyl radicals such as cyclobutenyl, cyclopentenyl, cyclohexenyl and cyclooctadecenyl; aryl radicals such as phenyl, xenyl, naphthyl and phenanthryl, aralkyl radicals such as benzl, β-phenylethyl and xylyl; and alkaryl radicals such as tolyl and ethylphenyl.

The substituted hydrocarbon radicals represented by R include halogenohydrocarbon radicals such as o-, m- and p-chlorophenyl, and bromophenyl radicals, α,α,α-trifluorotolyl, 3,3,3 - trifluoropropyl, $C_bF_{2b+1}CH_2CH_2—$, $(C_bF_{2b+1})_2CH(CH_2)_c—$ and $(C_bF_{2b+1})_3C(CH_2)_c—$ where $b$ is 1 to 12 and $c$ is 1, 2 or 3, chloro-, fluoro- and bromo- derivatives of the various hydrocarbon radicals set forth in the preceding paragraph as well as cyanoalkyl radicals such as β-cyanoethyl, cyanopropyl, cyano-n-butyl, cyano-n-propyl and omega-cyano-octadecyl. The cyanoalkyl radicals should be present on at least 1 mol percent of the silicon atoms present if any noticeable benefit is to be achieved from their presence.

The best results are achieved when the organic substituents represented by R have less than 19 carbon atoms and particularly with those substituents having less than 9 carbon atoms. Most preferred are the methyl radicals, and next preferred are the phenyl, vinyl, ethyl, propyl and 3,3,3-trifluoropropyl radicals. At least 50 mol percent of the R radicals should be aliphatic hydrocarbon radicals of not more than 4 carbon atoms. Of course, as is usually the case, the R radicals on a single silicon atom can be alike or different and various units in the siloxane chain can be similarly or differently substituted. Homopolymers (e.g. dimethylsiloxane polymers), copolymers (e.g. dimethylsiloxanemethylvinylsiloxane-, phenylmethylsiloxane polymers) and mixtures can be employed. The siloxane polymers employed can vary from relatively mobile fluids (viscosity 50 cs. at 25° C.) to gumlike materials having viscosities in the range of $10^6$ cs. at 25° C. This can be seen from the value of $n$ in the general formula above where $n$ is at least 3 and is preferably at least 50, but can have a value as high as 2,000. The preferred siloxane polymers are those having viscosities in the range from 200 to 200,000 cs. at 25° C.

The hydroxyl endblocked diorganosiloxane polymer described above is reacted with a diorganodiacyloxysilane of the formula $R_2Si(OOCR')_2$ wherein each R is as defined above and R' can be a hydrogen atom as in the formyloxy radical

or a monovalent hydrocarbon radical free of aliphatic unsaturation as in an acetoxy radical

as well as propionyloxy, butyryloxy, isovaleryloxy, hexyloxy, 2-ethylhexyloxy, stearyloxy, benzyloxy and p-tolyloxy. Preferably, R' contains less than 19 carbon atoms. The R' radicals can be alike or different. As is evident from the known prior art, the acetoxy silanes $[R_2Si(OOCCH_3)_2]$ are readily available and are preferred. Most preferred are the dimethyldiacetoxysilane, ethylmethyldiacetoxysilane, phenylmethyldiacetoxysilane, and similar silanes having alkyl radicals of 1 to 8 carbon atoms and aryl radicals bonded to Si through Si—C bonding. These acyloxysilanes are prepared by methods well-known in the art as by reaction of a dichlorosilane, $R_2SiCl_2$, with the organic acid corresponding the desired acyl radicals, or the anhydride or a metal salt of such acid. Of course, mixtures of diorganodiacyloxysilanes can be used, if desired.

The diorganodiacyloxysilane is employed in proportions such as to provide 0.1 to 1.2 gram equivalent silicon atoms of the acyloxysilane (2) per gram equivalent hydroxyl group in the diorganopolysiloxane (1). This usually means 0.2 to 2.0% by weight of the acyloxysilane (2) calculated on the total weight of the silicone rubber stock [i.e. (A)+(B)+fillers].

The hydroxyl terminated diorganopolysiloxane (1) is reacted with the diorganodiacyloxysilane (2) by mixing the reactants at room temperature (i.e. 15°–30° C.) and at normal pressure (i.e. about 760 mm. Hg). Higher and lower temperatures as well as super- and sub-atmospheric pressures can be used, but to little advantage. The reaction occurs within a period of from 10 minutes to 24 hours. The carboxylic acid liberated during the reaction can be removed from the reaction mass by any desired means. Removal of the by-produced carboxylic acid is not required. It is believed, but this invention is not dependent upon this theory, that the reaction of siloxane (1) with silane (2) occurs according to the following scheme:

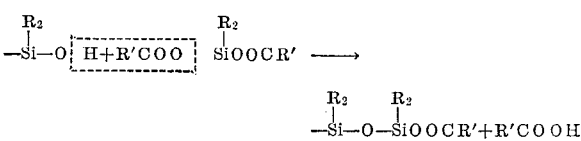

The diorganopolysiloxane prepared as above and containing at least some acyloxy groups as endblockers is mixed with a crosslinking agent which is a silicon compound having at least three acyloxy groups bonded to silicon per molecule. The acyloxysilicon crosslinking agent must be at least trifunctional, hence must have at least three acyloxy groups per molecule. Such materials are well-known in the art as shown in references such as U.S. Patents Nos. 3,035,016, issued May 15, 1962, which patent also disclosed hydroxyl endblocked siloxane polymers useful as ingredient (A) (1) herein; 3,133,891, issued May 19, 1964; 3,240,731, issued March 15, 1966, and 3,082,526, issued March 26, 1963, all of the foregoing patents being incorporated herein by this specific reference thereto.

The best known of the organosilicon crosslinking agents having at least three acyloxy groups per molecule are the silanes defined by the formula $R_mSi(OOCR')_{4-m}$ wherein R and R' are as above defined and $m$ is 0 or 1 as well as liquid partial hydrolyzates of such silanes. Operable siloxanes include those defined by the general formula

wherein R, R' and $m$ are as above defined and $p$ is 0 or an integer of 1 to 20,000. Mixtures of silanes and/or siloxanes can be employed within the framework of this invention so long as there are at least three acyloxy groups per molecule. The preferred crosslinking agents are the organotriacetoxysilanes wherein the organic substituents are methyl, ethyl, propyl, vinyl, phenyl and/or 3,3,3-trifluoropropyl.

The crosslinking agent (B) is employed in quantities such that the RTV rubber stock contains at least 1 gram equivalent, and preferably at least 2 grams equivalent, of acyloxy groups per gram equivalent of hydroxy groups originally present in the hydroxyl endblocked diorganopolysiloxane (A)(1). Expediently, 0.2 to 15% by weight of the acyloxysilicon compound (B) based on the total weight of diorganosiloxane polymer (A) and acyloxysilicon compound (B) is incorporated in the RTV silicone rubber stock.

The organopolysiloxane (A) and acyloxysilicon compound (B) can be admixed in any desired manner, but it is preferred to conduct the mixing procedure under exclusion of moisture. The materials can be admixed in a neutral solvent and can be packaged in any desired manner so long as moisture is excluded. Thus, aerosol or other pressure packaging systems can be employed.

The additives which are common to vulcanizable elastomeric materials based on diorganopolysiloxanes, viz., those for reducing compression set, retardants for crepe aging or structure formation, pigments, soluble, dyes, aromatics (essential oils), oxidation inhibitors, heat stabilizers, flame inhibitors and snuffers, light protectors, softeners, such as fluid trimethylsiloxy endblocked dimethylpolysiloxane, but especially reinforcing and non-reinforcing fillers can also be used. If some of the Si-bonded organic radicals, i.e., 0.5 to 10 mol percent of the Si-bonded organic radicals are radicals with aliphatic multiple bonds, particularly vinyl radicals, the use of organic peroxides in quantities of 0.01 to 5% by weight, calculated on the weight of the diorganopolysiloxane is advantageous. Condensation catalysts, such as dibutyl tin dilaurate can also be used (see, for example, the condensation catalysts employed in U.S. Patents Nos. 3,240,731 and 3,127,363).

Examples of reinforcing fillers, i.e., fillers with a surface of more than 50 m.$^2$/g. are fume silicas, silica hydrogels dehydrated while maintaining the structure, i.e., the so-called silica aerogels, and precipitated silica with a large surface area. These fillers can be treated by known methods and display organosiloxy or alkoxy groups at their surface, if desired. Non-reinforcing fillers, i.e., fillers with a surface of less than 50 m.$^2$/g. are, for example, calcium carbonate, diatomaceous earth and quartz flour, asbestos and glass fibers and frit; metal powders such as aluminum or nickel powder and metal oxide powder such as titanium dioxide, ferric oxide, aluminum oxide and zinc oxide with a surface area of less than 50 m.$^2$/g. Mixtures of various fillers can be used. Preferably the fillers are employed in quantities of 5 to 90% by weight, calculated on the total weight of organopolysiloxane and filler.

All of the above materials can be used without special drying, i.e., in their commercial air-dried form, in order to prepare the materials of the present discovery without damaging the storage life of the materials which must obviously be stored with careful exclusion of water.

The materials of the present discovery can be dissolved or dispersed in inert solvents, i.e., those which do not attack the SiOOC bond, in hydrocarbon such as benzene, toluene, xylene or petroleum ether; ethers such as diethyl ether and ketones and dibutyl ether such as methylisobutyl ketone, or they can be mixed with such solvents.

The materials of the present discovery can be stored in the absence of water; they will cure at room-temperature from the influence of water, the normal water content of the air is sufficient for this. In addition, to the water present in the air, water from another source such as tap water, water vapor and water from compounds containing crystal water or a compound containing another hydroxyl group can be used to cure the materials of the present discovery to elastomers. The curing can also be conducted at higher temperatures than room temperature, if desired. It will then proceed more rapidly.

The elastomers prepared from the materials of the present discovery will adhere firmly to a great variety of materials such as glass, porcelain, wood, plaster, concrete, stucco and mortar, metals, organic and organo-silicon plastics. The materials of the present discovery are, therefore, very suitable for adhesives or putties, e.g. for adhering organopolysiloxane elastomers obtained by other methods to other materials such as steel and glass; for sealing joints, e.g. for buildings, aircraft and motor vehicles, as well as dental closures, pouring materials and as coating lacquers. They are also suitable for any purposes in which diorganopolysiloxane-based room-temperature curing elastomers are commonly used, e.g. as protective coatings, for electrical and thermal insulation, for preparing impressions, for coating textiles and paper, as well as for preparing sheets, castings and laminates.

The following examples are included herein to assist those skilled in the art to fully understand and practice the invention. The scope of the invention is defined in the claims and is not limited by the following examples. The reactions set forth in the examples were carried forward at room-temperature (about 18° C.) and normal pressure (about 760 mm. Hg) unless otherwise stated. All viscosities were measured at 25° C.

Example 1

A mixture was prepared employing 100 parts by weight of a hydroxyl endblocked dimethylpolysiloxane of 20,000 cs. viscosity, 25 parts quartz flour, and 25 parts diatomaceous earth, and 100 g. of such mixture was admixed with 0.5 ml. of dimethyldiacetoxysilane. This mixture was allowed to stand for 12 hours and evolution of acetic acid from the mass was noted. An RTV silicone rubber stock was prepared by mixing 100 grams of the foregoing mixture with 2 ml. of methyltriacetoxysilane.

The mixture obtained above was coated on various substrates including zinc plates, electrically oxidated aluminum and phenol-formaldehyde-paper laminates. The mixture cured in the presence of atmospheric water vapor to form adherent rubber coatings on the substrates. A control stock produced as outlined above, but employing 0.5 ml. of acetic acid anhydride in place of the dimethyldiacetoxysilane hardens to form elastomers on the substrates, but the elastomers so formed do not adhere satisfactorily to the substrates and produce significant corrosion on the metallic substrates.

The material of this invention prepared above, as well as the control material, were each stored in ten aluminum tubes and ten cardboard boxes covered on both sides with aluminum foil. After a week of storage the cardboard boxes filled with the control material showed corrosion stains on the outer side and after two weeks of storage the aluminum sheets had holes caused by the corrosive action of the RTV rubber stored in the boxes. By way of contrast, the composition of the present invention did not stain or corrode the aluminum sheets on the cardboard boxes even after two weeks of storage.

The ten aluminum tubes filled with the control mixture were inspected from time to time and after four weeks of storage, six of the tubes displayed corrosion stains. After the same four weeks of storage, the ten tubes containing the composition prepared within the scope of this invention remained unchanged.

Example 2

A mixture was prepared with 100 parts by weight of an 80,000 cs. viscosity hydroxyl endblocked dimethylpolysiloxane, 10 parts fume silica and 5 parts crepe aging additive consisting of a hydroxylated methylpolysiloxane fluid of 95 mol percent $CH_3SiO_{3/2}$ units and 5 mol percent $(CH_3)_2SiO$ units with an HO/Si ratio of 2/25 and an ethoxy/Si ratio of 3/25, and 0.5 ml. of dimethyldiacetoxysilane was admixed with 100 g. of said mixture. After 5 hours, 2.2 ml. of methyltriacetoxysilane was admixed with the mixture to produce an RTV silicone rubber stock.

The RTV silicone rubber stock so produced was vulcanized after 24 hours at room-temperature in the atmosphere. The resulting elastomer had a measured resistance to tear propagation of 12 kg./cm. as measured by DIN 53,507. The print from a typewriter could be readily seen and read through a 4 mm. thick sheet of the cured elastomer.

A control RTV rubber stock prepared for comparison purposes and identical to the above except for elimination of the dimethyldiacetoxysilane (i.e. a mixture of hydroxyl endblocked polymer and methyltriacetoxysilane along with filler and crepe aging retardant) hardened within 24 hours to form an elastomeric sheet having a measured resistance to tear propagation (DIN 53,507) of only 4 kg./cm. and being sufficiently opaque to prevent reading typewritten material through a vulcanized sheet 4 mm. thick.

Example 3

Equivalent results were achieved when Example 1 was repeated employing in place of the 20,000 cs. viscosity hydroxyl endblocked dimethylsiloxane, 100 g. of any of the following; a 2,000 cs. viscosity hydroxyl endblocked dimethylsiloxane polymer; a 500,000 cs. viscosity dimethylsiloxane polymer having hydroxyl endblocks; ers and containing any combination of at least 50 mol percent dimethylsiloxane units and vinylmethylsiloxane units, phenylmethylsiloxane units, phenylvinylsiloxane units, 3,3,3-trifluoropropylmethylsiloxane units and butyl-50,000 cs. viscosity polymers having hydroxyl endblock-phenylsiloxane units; a mixture of 40 parts by weight of 100,000 cs. viscosity hydroxyl endblocked dimethylsiloxane and 20 parts by weight of 50 cs. dimethylpolysiloxane having a hydroxyl endblock and a trimethylsiloxy endblock on the alpha- and omega silicon atom respectively in each molecule; a 100,000 cs. hydroxyl endblocked copolymer of 99.9 mol percent dimethylsiloxane units and 0.1 mol percent $CH_3(HO)SiO$ units.

Example 4

Equivalent results were achieved when Example 1 was repeated employing in place of the 0.5 ml. dimethyldiacetoxysilane an equal amount of any of the following: diethyldiacetoxysilane, dipropyldiacetoxysilane, dihexyldiacetoxysilane, methylvinyldiacetoxysilane, methylphenyldiacetoxysilane, diphenyldiacetoxysilane, 3,3,3-trifluoropropylmethyldiacetoxysilane, 3-chloropropylmethyldiacetoxysilane and corresponding dipropionoxysilane, formyloxyacetoxysilanes, and butyryloxy-2-ethylhexyloxysilanes.

Example 5

Equivalent results were achieved when Example 1 was repeated employing in place of the 2 ml. of methyltriacetoxysilanes an equal amount of any of the following: tetraacetoxysilane, tetrabutyryloxysilane, methyltrioctanoyloxysilane, 3,3,3-trifluoropropylitriacetoxysilane, dodecyltriacetoxysilane, phenyltriacetoxysilane, isobutyltriacetoxysilane, vinyltriacetoxysilane, β-cyanoethyltriacetoxysilane and corresponding tripropionoxysilanes, formoyloxydiacetoxysilane, tributyryloxysilanes and tri-2-ethylhexyloxysilanes.

In addition to the foregoing specific examples clearly showing the chemical reactions and products of this invention it is to be emphasized that the diorganodiacyloxysilane (A)(2) can be replaced by essentially diorganosiloxane polymers containing per molecule at least two and an average of from 2 to 2.05 acyloxy radicals derived from alkanoic acids, preferably of less than 4 carbon atoms, the organic radicals bonded to silicon being R radicals as defined above. Such siloxanes can be exemplified by the general formula $R'COO(R_2SiO)_nOCR'$ where R and R' are as defined above and n is an integer of from 1 to 10,000 (see U.S. Patent No. 3,105,061).

Further, as noted above the acyloxy silicon compound (B) employed as a crosslinker can be a siloxane such as sym-dimethyltetraacetoxydisiloxane, methyldiacetoxysilyl endblocked dimethylsiloxane polymers of 5 to 20 silicon atoms per molecule, 1,3,3,5-tetramethyl-1,5-diacetoxy-1,5-dipropionyloxytrisiloxane and equivalent formyloxy and butyryloxysiloxanes having phenyl, vinyl, ethyl, 3,3,3-trifluoropropyl and cyanoethyl or cyanopropyl substituents bonded to Si (see U.S. Patent No. 3,240,731).

The improved tear resistance, optical clarity, improved adhesion to substrates and reduction of corrosive action on metal substrates achieved with the RTV silicone rubber stocks of this invention are wholly unexpected and could not be predicted from the prior art.

That which is claimed is:

1. A composition curable to form elastomers and admixed in the substantial absence of moisture consisting essentially of 85 to 99.8 percent by weight of a diorganopolysiloxane of the general formula $$(R'COO)-R_2SiO(R_2SiO)_{n-2}SiR_2(OOCR')$$

wherein each R' is a monovalent substituent selected from the group consisting of hydrogen atoms and hydrocarbon radicals free of aliphatic unsaturation, each R is a monovalent radical selected from the group consisting of hydrocarbon, halogenohydrocarbon and cyanoalkyl radicals and n has a value from 3 to 2,000, and 0.2 to 15 percent by weight of a silane of the formula $R_mSi(OOCR')_{4-m}$ where R and R' are as above defined and m is 0 or 1 or a liquid partial hydrolyzate of such silane.

2. A composition in accordance with claim 1 wherein each R and each R' is $CH_3$.

3. A composition in accordance with claim 1 further characterized in that it contains (C) 5 to 90% by weight based on the total weight of the composition of a filler.

4. A silicon rubber prepared by contacting the composition of claim 1 with water in a fluid form.

5. A silicon rubber prepared by contacting the composition of claim 3 with water in a fluid form.

References Cited

UNITED STATES PATENTS

| | | |
|---|---|---|
| 3,035,016 | 5/1962 | Bruner. |
| 3,061,575 | 10/1962 | Russell. |
| 3,240,731 | 3/1966 | Nitzsche et al. |

MORRIS LIEBMAN, Primary Examiner

L. T. JACOBS, Assistant Examiner

U.S. Cl. X.R.

260—46.5